United States Patent [19]
McGill et al.

[11] Patent Number: 5,409,031
[45] Date of Patent: Apr. 25, 1995

[54] SAFETY SHUT OFF VALVE

[76] Inventors: James C. McGill, 4442 Westcap Rd., Whites Creek, Tenn. 37189; Antonio F. Fernandez, L7 B48 Lagro Subd., Novaliches, Quezon City, Philippines

[21] Appl. No.: 149,569

[22] Filed: Nov. 9, 1993

Related U.S. Application Data

[63] Continuation-in-part of Ser. No. 82,605, Jun. 23, 1993, which is a continuation of Ser. No. 782,314, Oct. 24, 1991, abandoned.

[51] Int. Cl.⁶ .............................................. F16K 17/36
[52] U.S. Cl. ......................................... 137/38; 251/65
[58] Field of Search ........................ 137/38, 39; 251/65

[56] References Cited

U.S. PATENT DOCUMENTS

| | | | |
|---|---|---|---|
| 2,215,044 | 2/1939 | Kammerdiner | 137/38 |
| 3,747,616 | 7/1973 | Lloyd | 137/38 |
| 4,212,313 | 7/1980 | Winters | 137/39 |
| 4,245,814 | 1/1981 | Shimizu | 137/39 X |
| 4,382,449 | 5/1983 | Nelson | 137/38 |
| 4,485,832 | 12/1984 | Plemmons | 137/38 |
| 4,844,113 | 7/1989 | Jones | 137/39 |
| 5,052,429 | 10/1991 | Yoo | 137/38 |
| 5,119,841 | 6/1992 | McGill | 137/38 |

FOREIGN PATENT DOCUMENTS

| | | | |
|---|---|---|---|
| 57-12172 | 1/1982 | Japan | 137/38 |

*Primary Examiner*—Robert G. Nilson
*Attorney, Agent, or Firm*—Wenderoth, Lind & Ponack

[57] ABSTRACT

A device that will automatically shut-off the flow of a fluid when the device senses predetermined seismic and other shock forces. The device includes a housing having an inlet and outlet in communication with the flow of fluid. An inertia ball, which moves directly or indirectly from a resting position to block the flow of fluid, is held in a closed position by the force of an external magnet. When the external magnet moves about a given path, the inertia ball moves to a resting position, thus opening the flow of fluid. The movement of the external magnet along the given path forces the inertia ball to follow the magnet, thus providing an easy way of controlling the flow of fluid without the use of mechanical seals.

27 Claims, 11 Drawing Sheets

SAFETY SHUT OFF VALVE

This is a Continuation-In-Part of U.S. patent application Ser. No. 08/082,605, filed Jun. 23, 1993, which is a continuation of U.S. patent application Ser. No. 07/782,314, filed Oct. 24, 1991, now abandoned.

BACKGROUND OF THE INVENTION

1. Field of the Invention

The present invention relates to a safety apparatus for automatically interrupting the flow of a fluid, in particular a fuel line, upon the occurrence of a vibration or shock, such as a seismic disturbance or earthquake. In addition, it is a device that can be turned off manually with little effort and whenever desired without the use of special tools and a device which eliminates seals to the outside environment, thereby eliminating the possibility of leakage.

2. Description of the Prior Art

Various devices are known in the art for shutting off fuel systems in the event of a seismic disturbance or the like. For example, U.S. Pat. No. 4,331,171 to Novi requires a first ball to close the fuel line and at least a second ball, wherein a second ball is mounted within the casting in such a manner that a tremor would cause the second ball to dislodge the first ball from its pedestal and claim 11 requires the ball to close the fuel line to be mounted in a concave cup which is supported by a plurality of ball bearings and includes a concave member, as well as a resilient means (a spring or the like) for biasing the cup against the concave member. U.S. Pat. No. 4,565,208 to Ritchie requires the inclusion of a track and at least a ball riding in the track, and in addition requires the inclusion of "an obstruction" which causes the ball to leave the track when a seismic disturbance causes a ball to contact the obstruction with sufficient energy, and further requires the obstruction to include an inclined surface which extends over the track and has a height which decreases across the width of the track.

SUMMARY OF THE INVENTION

The purpose of the present invention is to provide and improve a safety device which is especially designed to eliminate the need for an external seal when the fuel flow is turned off or on by manual or automatic operation or the like, which provides an easy manual means of turning off the flow of fuel whenever desired. To achieve this result, we employ a magnet or the like actuated in an external manner to open and close the flow of fuel.

In one embodiment of the invention, an on/off member comprises a safety apparatus for automatically shutting off the flow through a housing as a result of inertia induced movement of one or more elements by selected vibrations of given frequencies and acceleration. The device includes an enclosed housing, an inertia ball or the like resting in a biased recess, a recessed indentation of a predetermined configuration which is part of a first member that can pivot when a second member moves out of the said recess beyond the pivot point on to a lever mounted on the first member, causing the first member to rotate and move the second member into the field of the magnet and force the first member to effect a seal to stop the flow. An external magnet is moved about a given path to cause the second member to force the first member to its original position; when the magnetic force is removed, the second member is reseated to its resting position. Likewise the external magnet can be moved about the given path to manually shut off the flow in the reverse order described above.

A modified embodiment of the invention includes a housing, an inertia ball or the like resting in a biased recess, and a recessed indentation of a predetermined configuration as part of a first member that can pivot when a second member moves out of the recess beyond the pivot point. The first member rotates and moves the second member into the field of the magnet and forces the first member to effect a seal to stop the flow. An external magnet or the like is moved about a given path to cause the second member to force the first member to its original position. When the magnetic force is removed, the second member is reseated to its resting position. Likewise the external magnet can be moved about the given path in the reverse order to manually shut-off the flow.

In a second embodiment of the invention, the on/off member comprises a safety apparatus for automatically shutting off the flow through a housing as a result of inertia induced movement of one or more elements by certain vibrations of given frequencies and acceleration. The device includes a housing, an inertia ball or the like resting in a biased recess, and a recessed indentation of a predetermined configuration. The inertia ball is moved out of the indentation to a second position on to a sealing surface, thereby stopping the flow. The external magnet is moved to exert a magnetic force on the inertia ball and thereby removes the inertia ball from the sealing surface, and by following a given path reseats the inertia ball to the original position, which opens the flow. The external magnet can be moved about the given path in the reverse order to manually shut-off the flow.

According to a third embodiment of the present invention, the magnet moves on the side surface of the housing in a groove or channel provided therefor. The magnet is moved by a rotating drive member or lever. By rotation of the drive member or lever, the inertia ball can be easily and quickly manually reset, or the valve device can be easily manually tripped.

According to a further feature of the present invention, the recess provided for the inertia ball is conical. A conical recess provides preferred damping characteristics with respect to actuation of the valve due to vibrations or seismic shocks. To improve these characteristics, further, annular ridges or raised surfaces can be provided in the conical recess.

BRIEF DESCRIPTION OF THE DRAWINGS

Preferred embodiments of the present invention are described below with reference to the drawing figures, in which.

DETAILED DESCRIPTION OF THE INVENTION

Figure 1:
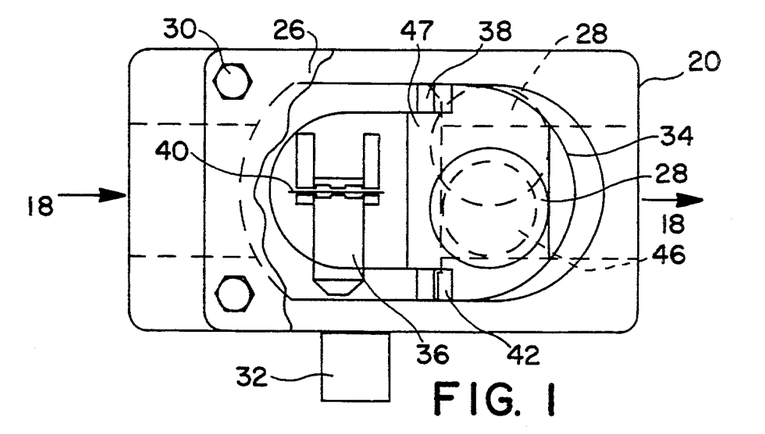
FIG. 1 is a top, partially cut away, view of a first preferred embodiment of a safety shut-off valve in an open position.
Figure 2:
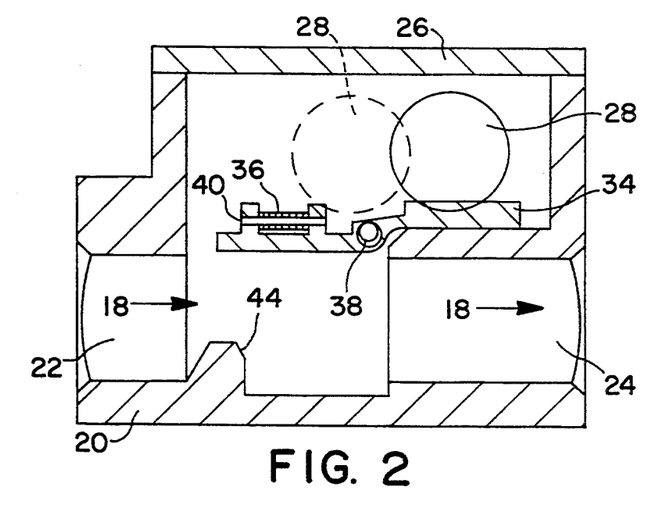
FIG. 2 is a cross-sectional front view of FIG. 1, showing the movement of an inertia ball from a resting position.
Figure 3:
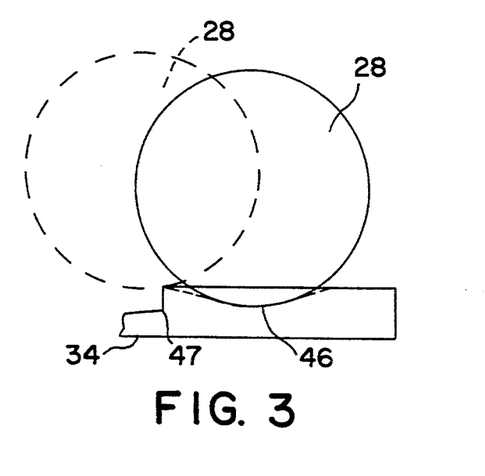
FIG. 3 is a detail of a bias recess and movement of the inertia ball.
Figure 4:
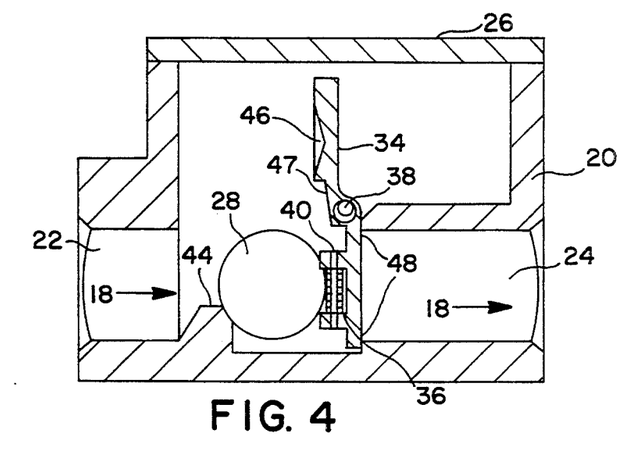
FIG. 4 is similar to FIG. 2, but shows the valve closed and in the off position.
Figure 5:
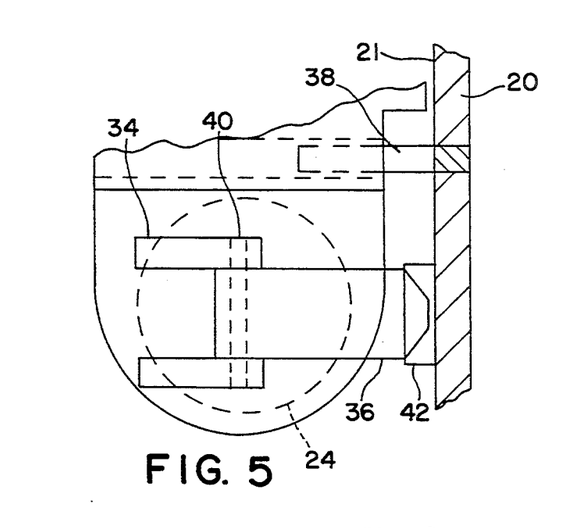
FIG. 5 is a detail of a flapper assembly showing a flapper sealing an outlet.
Figure 6:
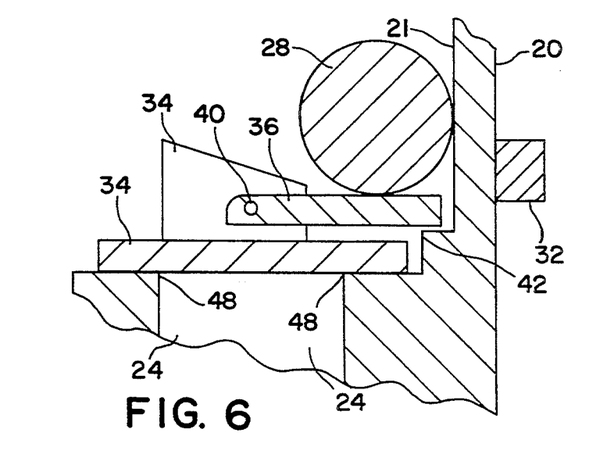
FIG. 6 is an end section detail showing the flapper assembly locked into position by the inertia ball and an external magnet.

A preferred embodiment of the present invention will now be described with references to FIGS. 1-8. The safety shut-off valve consists of a closed housing 20, with a top cover 26 being fastened by bolts 30, having an inlet 22 and an outlet 24. A flapper assembly 34 has a pivot 38 affixed to the housing 20. The flapper assembly 34 consists of a hinged lever 36 attached by a hinge pin 40 to the flapper assembly 34 as shown in FIGS. 1-2. The flow of fluid through the valve is shown by flow arrows 18. An inertia ball 28 is shown in FIG. 3 in its recessed or biased position.

The operation of the valve to shut off the flow of fluid during seismic vibrations of a given magnitude causes the inertia ball 28 to move out of a bias recess 46 (FIGS. 1 & 3) and past the pivot 38 of the flapper 34, causing the flapper 34 to rotate about the pivot 38 as shown in FIG. 2. The action of gravity on the inertia ball 28 (FIG. 4) continues the rotation of the flapper 34 until the inertia ball 28 comes to rest between a ball stop 44, lever 36, and housing wall 21 (FIG. 6) of a controlled thickness, where the lever 36 stops against a ledge or lever stop 42 (FIGS. 5 & 6) and simultaneously enters into the magnetic field of an external magnet 32, located in a set position below the center of the stopped position of the inertia ball 28 (FIG. 6) and thereby applying an additional force onto the lever 36, pivot pin 40, and flapper 34, thus applying a uniform self-aligning force to a sealing surface 48 of an outlet 24, which causes a positive shut-off of the flow of gas.

Figure 7:
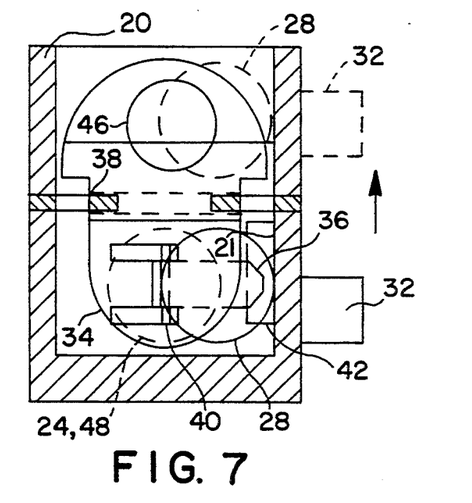
FIG. 7 shows an end cut away section showing the flapper assembly and the movement of the inertia ball and the external magnet.
Figure 8:
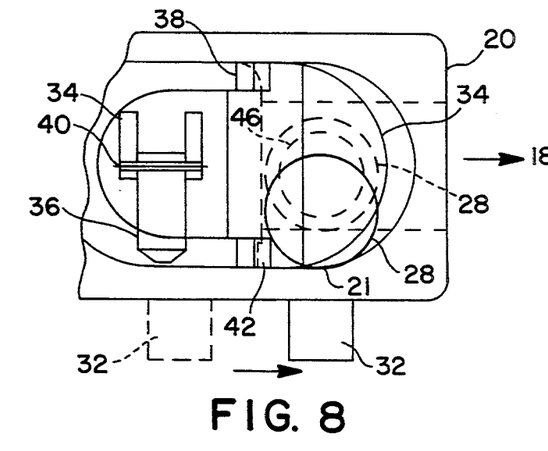
FIG. 8 is a top cut away view showing a final movement of the inertia ball to an open position by the controlled movement of the external magnet.

The operation of the valve to turn on the flow of fluid is manually performed by movement of the external magnet 32 around a path as shown in FIGS. 7 & 8. More specifically, as the external magnet 32 is moved upward along a controlled path, the inertia ball 28 will follow along the surface 21 past the pivot point 38, thus forcing the flapper 34 to rotate and open the valve as shown in FIG. 7. By continuing the movement of the magnet 32 along the given path, the inertia ball comes to rest at the original horizontal position shown in FIG. 8. An additional safety is provided when the external magnet 32 is moved upward along a controlled path, as previously described. Should the flapper 34 fail to rotate into the open position, thus indicating that the fluid pressure differential is greater than the force produced by the magnet 32, this would indicate that the fluid should not be turned on for safety reasons.

Figure 9:
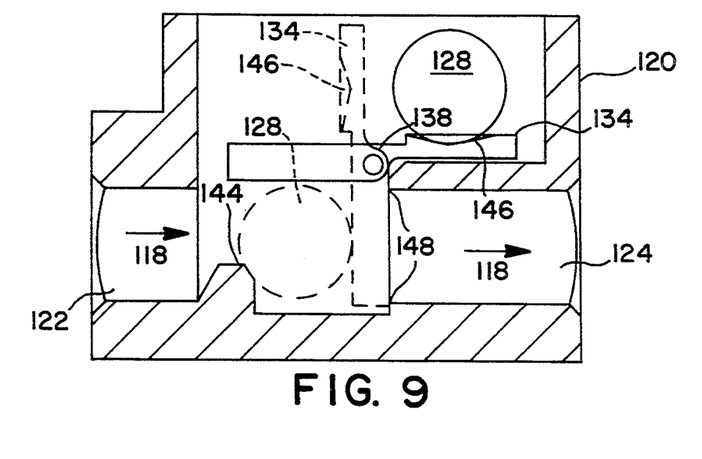
FIG. 9 shows a sectional cut away front view of a modified embodiment similar to FIG. 2.
Figure 10:
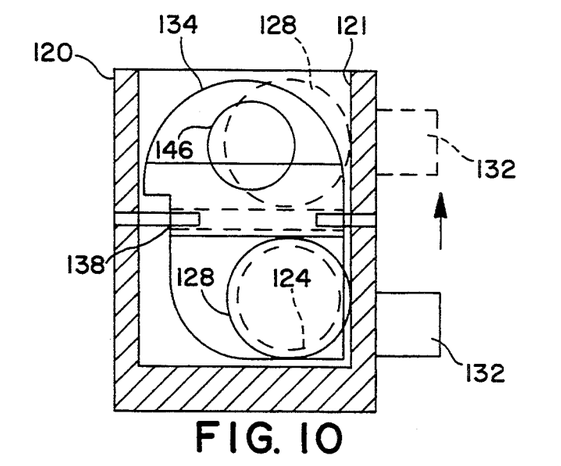
FIG. 10 shows a cut away end view of a modified flapper, movement of the inertia ball and the external magnet similar to FIG. 7.

A modified embodiment of the present invention will now be described with reference to FIGS. 9 and 10. Similar to the previous embodiment, the valve consists of a closed housing 120 shown without the top cover and having an inlet 122 and an outlet 124. A flapper 134, of another version, is made in one piece, thus eliminating the lever, as shown in FIG. 9. The flow of fluid through the valve is shown by flow arrows 118. An inertia ball 128 is shown in FIG. 9, depicting the movement of the inertia ball 128 from a biased recess 146 to the off position. The operation of the valve is similar to the above embodiment, except the flapper 134 is held in the off position by the inertia ball 128 being forced by the action of gravity and a magnetic force exerted by an external magnet 132 against a ball stop 144 and the flapper 134.

More specifically, the operation of the valve shuts off the flow of fluid during seismic vibration by the movement of the inertia ball 128 out of the biased recess 146 (FIG. 9), past the pivot 138 of the flapper 134, causing the flapper 134 to rotate about the pivot 138 as shown in FIG. 9. The action of gravity on the inertia ball 128 moves the inertia ball to a rest position between the ball stop 144 and the flapper 134, simultaneously entering into the magnetic field of the external magnet 132, located below the center of the stopped position of the inertia ball 128, thereby applying an additional force onto the flapper 134 and causing a positive sealing off of the fluid flow against the outlet 124, as shown in FIG. 10. The operation of the valve to turn on the flow of fluid is the same as the previous embodiment.

The second embodiment is described in FIGS. 11-16. The safety shut-off valve consists of a closed housing 220 with a top cover 226 fastened by bolts or the like (not shown) and has an inlet 222, outlet 224, and ball seat 248.

Figure 11:
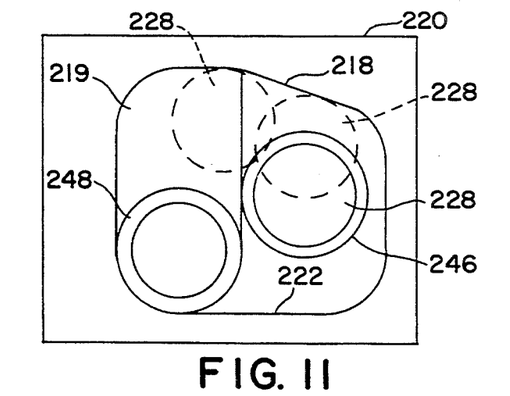
FIG. 11 shows a cut away top view of a second embodiment showing movement of an inertia ball.
Figure 12:
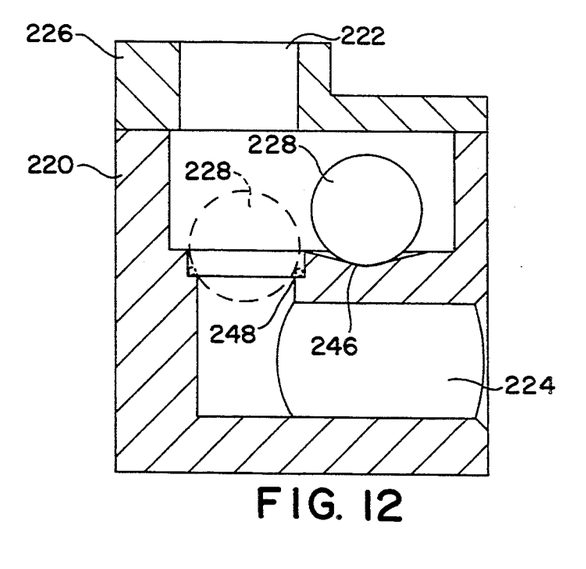
FIG. 12 shows a sectional front view showing the movement of the inertia ball of FIG. 11 into a seat to cut off flow.
Figure 13:
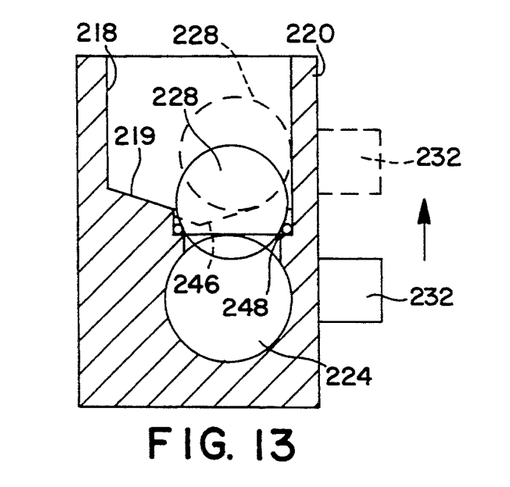
FIG. 13 shows an end section with the inertia ball moved by the magnet near to its final resting position.
Figure 14:
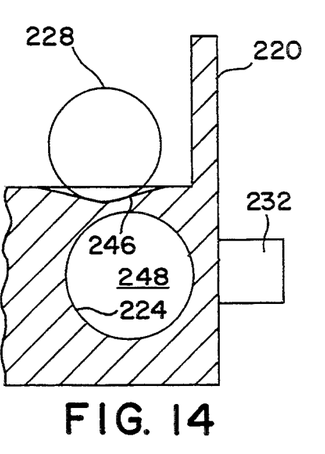
FIG. 14 is an end section showing the final movement of the inertia ball to its original resting position and showing the external magnet as having released the inertia ball.
Figure 15:
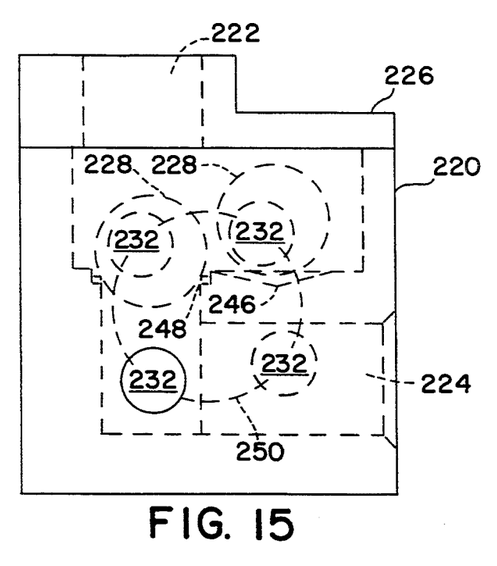
FIG. 15 shows the movement path of the magnet.

The operation of the valve during seismic activity or vibration of a given magnitude causes an inertia ball 228 to move out of a biased recess 246, and as shown FIG. 11, should the inertia ball not fall directly into a valve seat 248, it will be deflected by a vertical surface 218 to a downward positioned surface 219 until it comes to rest on the ball seat 248, thereby stopping the flow of fluid, as shown in FIG. 12. The operation of the valve, to reset the flow of fluid to the on position, is manually performed by the movement of an external magnet 232. Magnet 232 moves along a path (FIG. 15) to cause the magnetic force to overcome a force exerted by gravity and the pressure differential, which causes the inertia ball 228 to be pulled off of the ball seat 248 and come in contact with the wall surface of the housing 220, thus opening the flow of fluid through the valve, as shown in FIG. 13. As the external magnet 232 is moved further along its path, the inertia ball 228 comes in contact with the surface of the biased recess 246, thus stopping the movement of the inertia ball 228. When the external magnet 232 moves to a position that reduces the magnetic force exerted on the ball 238, the inertia ball 238 moves to rest in the biased recess 246. By rotating the magnet manually, along the previously described path, in the opposite direction, the magnet will attract the inertia ball 228 against the wall surface and will follow along the path until the ball comes in contact with the seat 248. The magnet 232 continues to move to a point where the magnetic attraction is aligned in a manner so as to force the ball into the seat 248, this being the off position.

Figure 16:
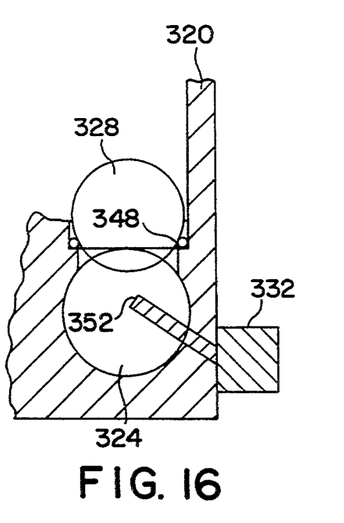
FIG. 16 is a cross-sectional view of a modified embodiment, showing the inertia ball seated and held against its seat by the magnet through a magnetically attractable material.

Another embodiment shown in FIG. 16 shows an inertia ball 328 being held into a seat 348 by the magnetic force exerted by a magnetically attractable material or magnet 352, thereby assuring a more positive seating of the inertia ball 328 into seat 348.

Referring now to FIG. 12, housing 220 has flow-way 250 between inlet 222 and outlet 224. Ball cavity 252 intersects flow way 250 between inlet 222 and outlet 224. Ball 228 is sized to move freely within ball cavity 252. Ball 228 resides in recess 246 when at the open position and rests in seat 248 when at the closed position.

FIGS. 17-28 illustrate a third embodiment according to the present invention, along with modifications thereof. Referring initially to FIGS. 17-20, there is illustrated a housing 420 having a removable top cover 426 and defining a gas inlet 422 and a gas outlet 424. The flow of gas through the housing is illustrated by arrows 418 in the various figures. A flow passage connects the inlet and the outlet. In the flow passage is disposed a valve seat 448 for the receipt of an inertia ball 428 acting as a valve member. In an open position of the valve, the inertia ball 428 is located in a recess 446.

The recess 446 is preferably in the form of an inverted cone. However, as can be seen from FIG. 28, the inverted cone recess 446 can advantageously be provided with ridges or raised surfaces 466, as opposed to a smooth flat surface. The advantage of such ridges is that the inertia ball 28 can be dampened or slowed in the recess 446 with the ridges. This helps to prevent the inertia ball from being dislodged from the recess to turn off the valve in situations where the predetermined vibration or seismic shock is not actually present i.e. this helps to prevent false tripping of the valve. Further, the dampening function provided by the ridges prevents the ball 428 from becoming dislodged at its natural frequency.

Figure 17:
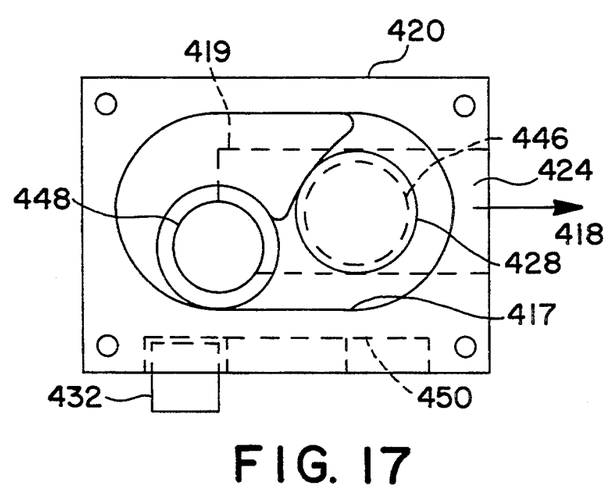
FIG. 17 is a top view, with a cover removed, of a third embodiment according to the present invention.
Figure 18:
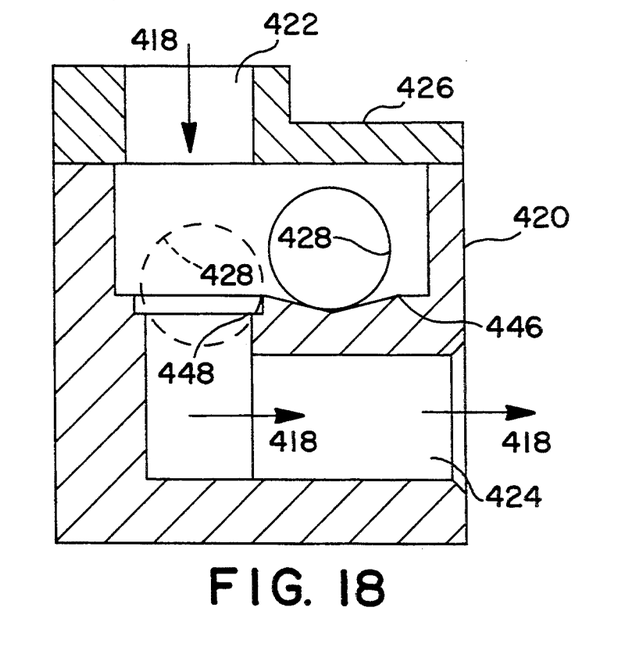
FIG. 18 is a sectional side view of the embodiment of FIG. 17.

Turning again to FIGS. 17-20, it can be seen that the recess 446 is positioned inside the housing 420 to enable the inertia ball 428 to be dislodged therefrom and fall onto the valve seat 448 so as to close the valve upon the occurrence of a vibration or seismic shock of a predetermined magnitude. The inertia ball 428 can deflect off of a vertical surface 417 inside the housing 420. An angled or sloped surface 419 is also provided inside the housing, as best seen in FIG. 17, to help direct the inertia ball into the valve seat 448. By the ball being able to deflect off of the vertical surface 417, the ball is allowed to move onto the angled surface no matter in what direction the inertia occurs.

Figure 19:
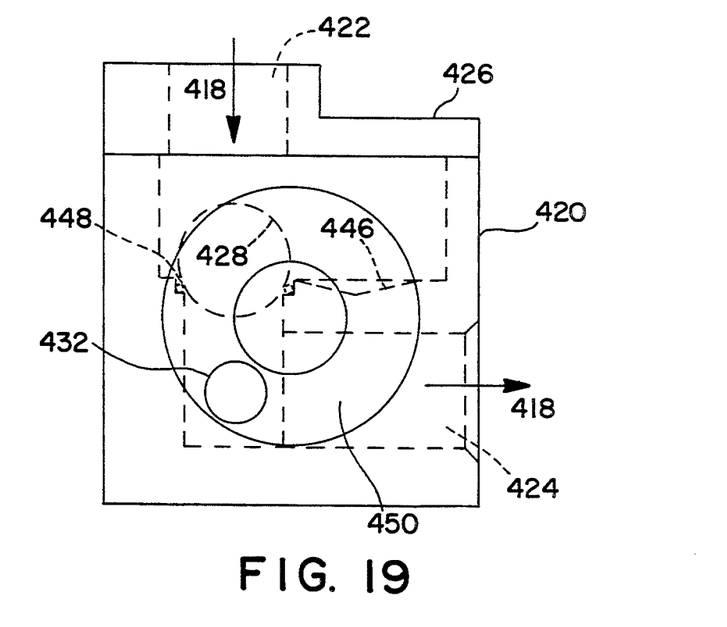
FIG. 19 is a side view of the third embodiment with the internal features thereof shown in dashed lines.

Provided on the outside of the housing 420, opposite to the vertical surface 417, is a magnet path groove 450. A magnet 432 is disposed in this groove 450. Thus, the magnet 432 is movable in the magnetic path groove 450 between a sealing or set position, as illustrated in FIG. 19, with the magnet below the valve seat 448 and attracting the inertia ball 428 onto the valve seat, to a reset position at the recess 446 for moving the inertia ball 428 from the valve seat 448 onto the recess 446. Thus, not only does the force of gravity and the fluid pressure in the direction illustrated by arrows 418 hold the inertia ball 428 on the valve seat 448, but the magnet 432, being positioned at the sealing position illustrated in FIG. 19, applies an additional magnetic force to effect a better seal.

Figure 20:
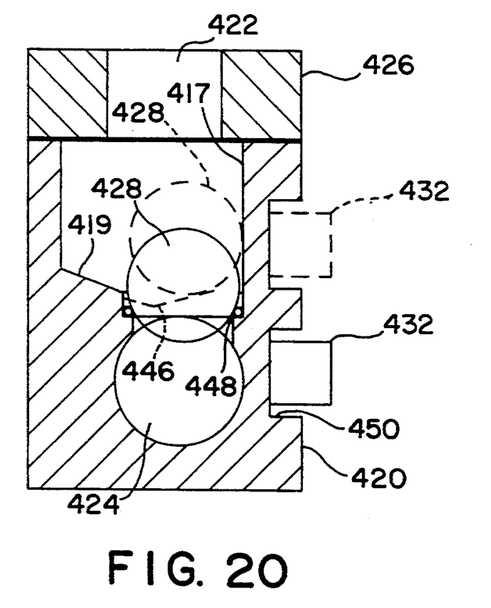
FIG. 20 is a front sectional view of the third embodiment according to the present invention illustrating the movement of a magnet and an inertia ball.

As can be seen from the dashed line position in FIG. 20, the inertia ball 428 can be moved off of the valve seat 448 back to the recess 446 by the movement of the magnet 432. The ball 428 follows the magnet 432 along the inner vertical wall 417. Noting the magnet path groove 450, one advantage of this groove, in addition to guiding the magnetic 432, is that the wall thickness along the groove is reduced, allowing the magnet 432 to be located closer to the inertia ball 428. Outside of the groove, the thickness of the wall of the housing 420 is sufficiently thick to provide a strong structure.

Figure 21:
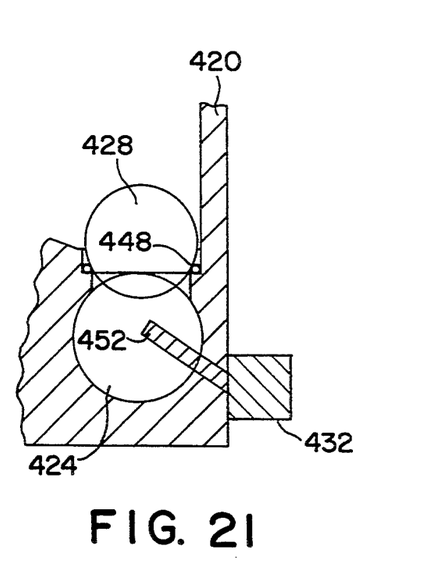
FIG. 21 is a front sectional view similar to FIG. 20 but illustrating a modification of the third embodiment.

Similarly to the embodiments discussed above, a magnetic transfer member 452, made of a magnetic material, can be provided in the housing below the valve seat 448 in order to transfer the magnetic force closer to the inertia ball 428, thus supplying an additional force to hold the ball 428 in the closed position of the valve. Note that the member 452 could also be a magnet in itself, in this case the magnet 432 then being a much stronger magnet which still can unseat the inertia ball 428 when moving the inertia ball 428 from the closed position to the reset position in the recess 446. The inertia ball 428, by the provision of a magnetic force holding it onto the valve seat 448, is thus more securely held in place.

Figure 22:
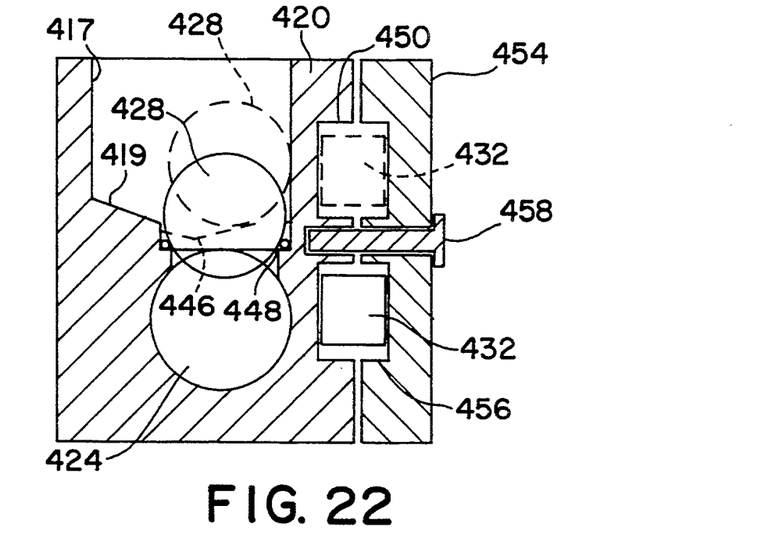
FIG. 22 is a further front sectional view according to the third embodiment, in particular illustrating a magnet drive member.
Figure 23:
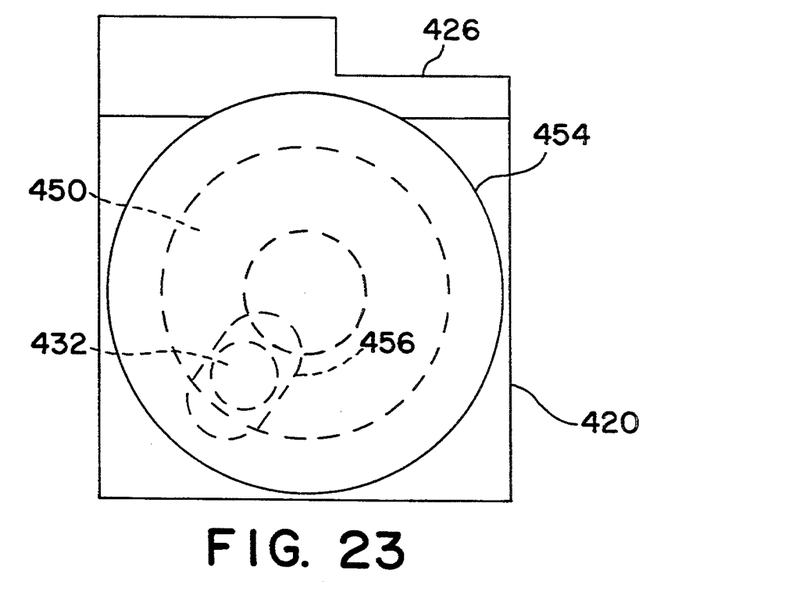
FIG. 23 is a side view of the apparatus as illustrated in FIG. 22.

Noting FIGS. 22 and 23, there is illustrated a drive member 454 rotatably mounted on the housing 420 by a pivot pin 458. The drive member 454 is provided with a drive slot 456, the drive slot 456 engaging the magnet 432 located in the magnet path groove 450. Thus, by rotation of the drive member 454, the magnet 432 can be moved between the sealing and reset positions. It is noted that though the magnetic path groove 450 is circular, the drive slot 456 can allow the path to be of almost any shape, because the drive slot is elongated and can allow for some movement of the magnet 432 in the radial direction of the drive member 454.

Figure 24:
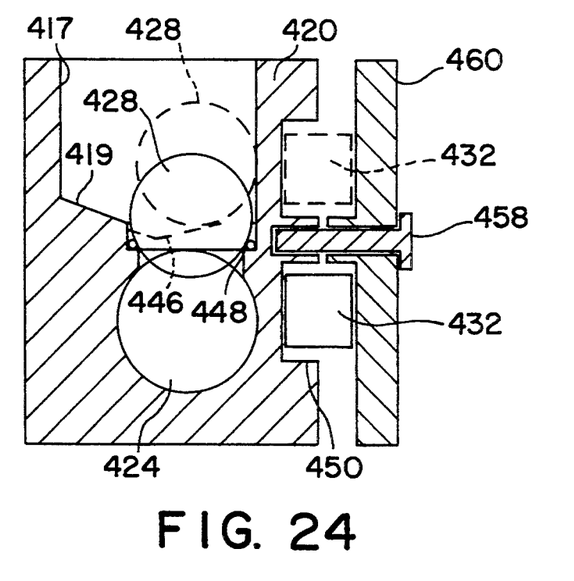
FIG. 24 is a view similar to FIG. 22, but illustrating a drive lever for moving the magnet.
Figure 25:
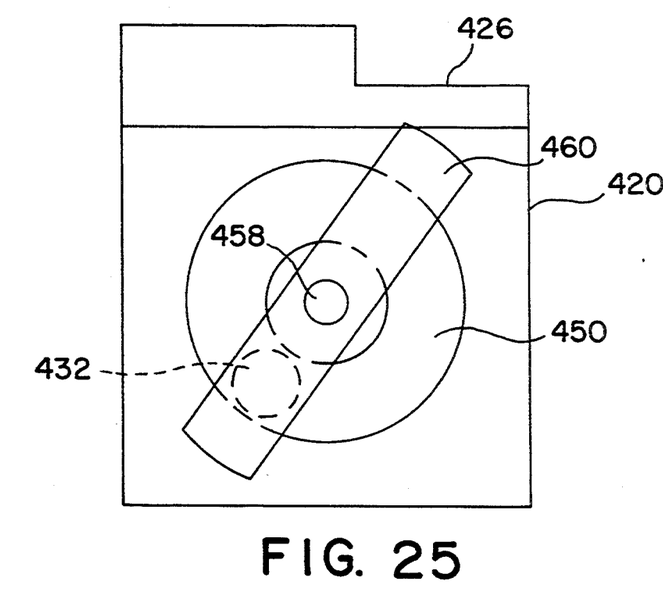
FIG. 25 is a side view of the apparatus illustrated in FIG. 24.

An alternative to the above-described drive member 454 is illustrated in FIGS. 24 and 25. In these figures, the drive member 454 is replaced by a drive lever 460. In this case, the magnet 432 is simply fixed to the lever 460.

It is noted that in both the situation of the drive member 454 and the drive lever 460, a suitable catch or detent could be provided so as to hold the drive member or lever in the sealing position or any other desired position.

Figure 26:
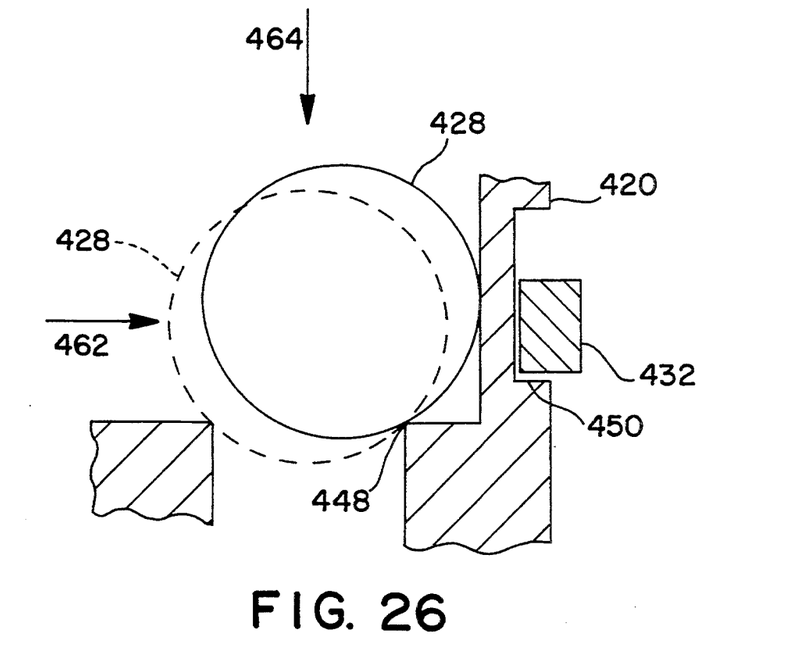
FIG. 26 is a partly sectional detailed view of movement of the inertia ball out of a valve seat.

Referring now to FIG. 26, the action of the magnet 432 moving the inertia ball 428 from the valve seat 448 is described. When the magnet 432 reaches a point along the magnet path groove 450 wherein it is sufficiently close to the ball, the ball will pivot out of the valve seat 448 and will follow the magnet 432 along the same path as the magnet path groove 450. Lifting the inertia ball 428 out of the valve seat 448 in this manner provides a significant advantage over attempting to lift the inertia ball 428 off of the valve seat 448 from above.

Figure 27:
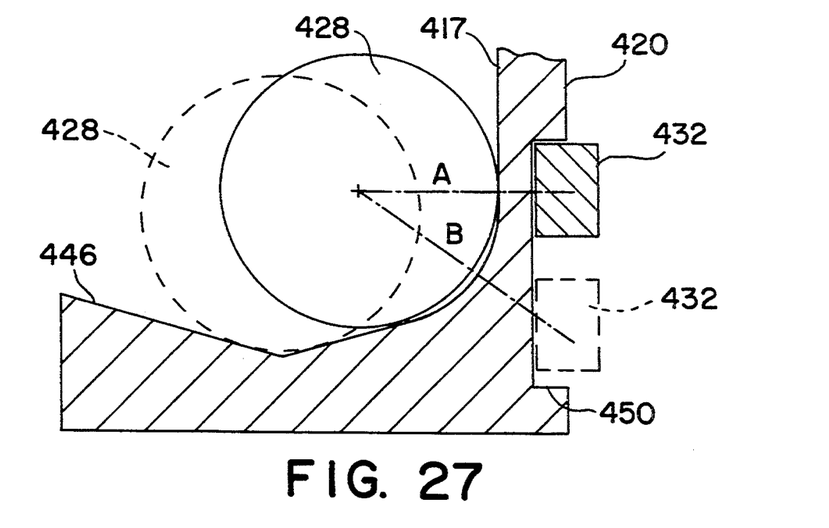
FIG. 27 is a partly sectional detailed view of movement of the inertial ball into a recess.
Figure 28:
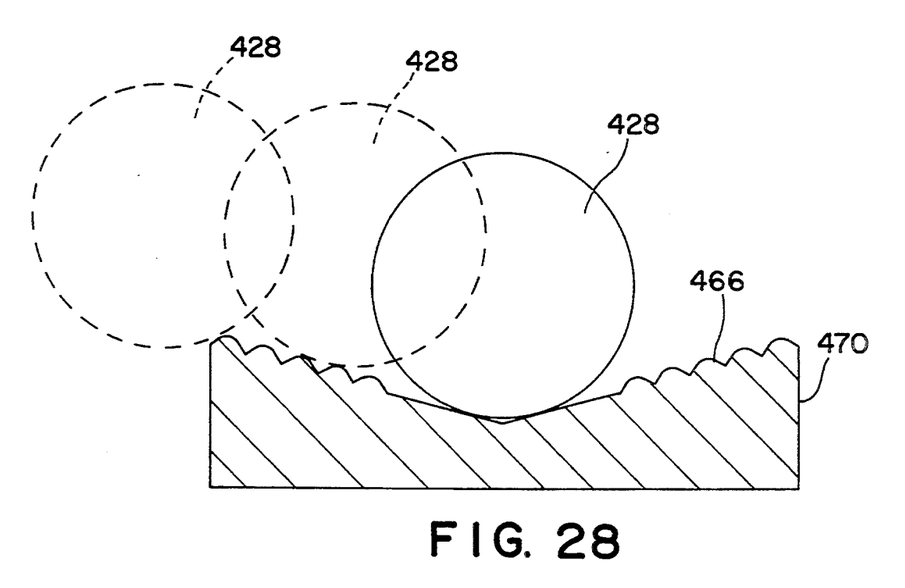
FIG. 28 is a sectional view of a conical recess for the inertia ball.

Referring now to FIG. 27, there is illustrated the deposition of the inertia ball 428 into the inverted cone recess 446. The external magnetic 432 is moved along the path 450, and as the magnet 432 moves downward, the distance from the inertia ball 428 increases. For example, note that distance B is greater than distance A. When the distance between the magnet 432 and the inertia ball 428 has become sufficiently great, the magnet 432 will release the inertia ball 428, allowing the ball to be reseated in the inverted cone recess. The inertia ball 428 is in this manner returned to the open position of the valve.

It is noted that, of course, the inlet of the housing 422 does not necessarily need to go through the top 426. The inlet and the outlet could be arranged in any suitable manner still allowing for the operation of the valve according to the present invention. In addition, the housing 420 can of course can be provided with threads or other suitable connectors for connecting pipe fittings.

While the present invention has been described with reference to the foregoing embodiments, it will be understood by those skilled in the art that various changes and modifications may be made thereto which fall within the scope of the appended claims.

We claim:

1. A safety shut-off apparatus for shutting off the flow of a fluid upon occurrence of a vibration or seismic shock of a predetermined magnitude, comprising:
   a housing having an inlet port, an outlet port and a fluid flow passage extending between said inlet port and said outlet port;
   a valve member in said housing;
   a valve seat positioned in said fluid flow passage in said housing such that when said valve member is positioned on said valve seat in a closed position, said valve member blocks said fluid flow passage;
   a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and
   a magnetic means for moving said valve member between said closed position and said open position, said magnetic means comprising a magnet movable between a reset position and a sealing position, said sealing position being located below said valve member when said valve member is in said closed position so that said magnet magnetically attracts said valve member onto said valve seat, and said reset position being located adjacent to said valve member recess so that said magnet can return said valve member to said open position from said closed position;
   Wherein said housing has a groove thereon extending between said reset position and said sealing position, and said magnet is disposed in said groove for movement therein.

2. A safety shut-off apparatus for shutting off the flow of a fluid upon occurrence of a vibration or seismic shock of a predetermined magnitude, comprising:
   a housing having an inlet port, an outlet port and a fluid flow passage extending between said inlet port and said outlet port;
   a valve member in said housing;
   a valve seat positioned in said fluid flow passage in said housing such that when said valve member is positioned on said valve seat in a closed position, said valve member blocks said fluid flow passage;
   a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and
   a magnetic means for moving said valve member between said closed position and said open position, said magnetic means comprising a magnet movable between a reset position and a sealing position, said sealing position being located below said valve member when said valve member is in said closed position so that said magnet magnetically attracts said valve member onto said valve seat, and said reset position being located adjacent to said valve member recess so that said magnet can return said valve member to said open position from said closed position;
   wherein said housing has an angled surface therein adjacent to said valve member recess for directing said valve member onto said valve seat.

3. A safety shut-off apparatus for shutting off the flow of a fluid upon occurrence of a vibration or seismic shock of a predetermined magnitude, comprising:
   a housing having an inlet port, an outlet port and a fluid flow passage extending between said inlet port and said outlet port;
   a valve member in said housing;
   a valve seat positioned in said fluid flow passage in said housing such that when said valve member is positioned on said valve seat in a closed position, said valve member blocks said fluid flow passage;
   a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and a magnetic means for moving said valve member between said closed position and said open position, said magnetic means comprising a magnet movable between a reset position and a sealing position, said sealing position being located below said valve member when said valve member is in said closed position so that said magnet magnetically attracts said valve member onto said valve seat, and said reset position being located adjacent to said valve member recess so that said magnet can return said valve member to said open position from said closed position;

Wherein said housing has an interior vertical surface along one side thereof, said magnet is disposed on the exterior of said housing along said side of said housing, and said side of said housing has a portion thereof that is thinner than the remainder of said side, said magnet being disposed in said portion.

4. A safety shut-off apparatus for shutting off the flow of a fluid upon occurrence of a vibration or seismic shock of a predetermined magnitude, comprising:

a housing having an inlet port, an outlet port and a fluid flow passage extending between said inlet port and said outlet port;

a valve member in said housing;

a valve seat positioned in said fluid flow passage in said housing such that when said valve member is positioned on said valve seat in a closed position, said valve member blocks said fluid flow passage;

a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and a magnetic means for moving said valve member between said closed position and said open position, said magnetic means comprising a magnet movable between a reset position and a sealing position, said sealing position being located below said valve member when said valve member is in said closed position so that said magnet magnetically attracts said valve member onto said valve seat, and said reset position being located adjacent to said valve member recess so that said magnet can return said valve member to said open position from said closed position;

Wherein said valve member recess is conical.

5. The apparatus of claim 4, wherein said conical valve member recess has a plurality of annular ridges therein.

6. A safety shut-off apparatus for shutting off the flow of a fluid upon occurrence of a vibration or seismic shock of a predetermined magnitude, comprising:

a housing having an inlet port, an outlet port and a fluid flow passage extending between said inlet port and said outlet port;

a valve member in said housing;

a valve seat positioned in said fluid flow passage in said housing such that when said valve member is positioned on said valve seat in a closed position, said valve member blocks said fluid flow passage;

a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and a magnetic means for moving said valve member between said closed position and said open position, said magnetic means comprising a magnet movable between a reset position and a sealing position, said sealing position being located below said valve member when said valve member is in said closed position so that said magnet magnetically attracts said valve member onto said valve seat, and said reset position being located adjacent to said valve member recess so that said magnet can return said valve member to said open position from said closed position;

Wherein said housing has a magnetic force transfer member therein positioned below said valve seat adjacent to said sealing position of said magnet for attracting said valve member onto said valve seat.

7. A safety shut-off apparatus for shutting off the flow of a fluid upon occurrence of a vibration or seismic shock of a predetermined magnitude, comprising:

a housing having an inlet port, an outlet port and a fluid flow passage extending between said inlet port and said outlet port;

a valve seat positioned in said fluid flow passage in said housing;

a valve device movably positioned in said housing above said valve seat for movement under the force of gravity from an open position wherein said fluid flow passage is open to a closed position wherein said valve device engages said valve seat and closes said fluid flow passage due to vibrations or seismic shocks of a predetermined magnitude; and a magnet on said housing for moving said valve device from said closed position to said open position, said magnet being movable to and from a set position, said set position being located such that said magnet provides a magnetic force to said valve device tending to move said valve device into said closed position when said magnet is located in said set position, and said valve device is located in said open position.

8. The apparatus of claim 7, wherein said valve device includes a flapper pivotably mounted in said housing having a sealing surface for engagement with said valve seat in said closed position and a recess supporting an inertia ball in said open position, whereby vibrations or seismic shocks of a predetermined magnitude can cause said inertia ball to leave said recess and cause said flapper to pivot into said closed position.

9. The apparatus of claim 8, wherein in said closed position said inertia ball engages said flapper and holds said sealing surface against said valve seat.

10. The apparatus of claim 9, wherein a ball stop is positioned opposite to said valve seat such that said inertia ball engages said ball stop in said closed position.

11. The apparatus of claim 9, wherein said flapper has a hinged lever thereon and said housing has a lever stop therein such that in said closed position said inertia ball engages said hinged lever and said hinged lever engages said lever stop.

12. The apparatus of claim 7, wherein said valve device comprises an inertia ball resting in a recess in said housing positioned above said valve seat in said open position, whereby vibrations or seismic shocks of a predetermined magnitude can cause said inertia ball to leave said recess and fall into said valve seat.

13. The apparatus of claim 12, wherein said housing has a groove thereon and said magnet is disposed in said groove for movement therein.

14. The apparatus of claim 13, wherein a drive member is rotatably connected to said housing over said groove, said drive member having a drive slot therein, and said magnet being disposed in said drive slot, whereby rotation of said drive member moves said magnet in said groove.

15. The apparatus of claim 13, wherein said groove forms a closed loop on a side of said housing.

16. The apparatus of claim 13, wherein a lever is rotatably connected to said housing over said groove, said magnet being fixed to said lever, whereby rotation of said lever moves said magnet in said groove.

17. The apparatus of claim 12, wherein said housing has an angled surface therein adjacent to said recess for directing said inertia ball into said valve seat.

18. The apparatus of claim 12, wherein said housing has an interior vertical surface along one side thereof, said magnet is disposed on the exterior of said housing along said side of said housing, and said side of said housing has a portion thereof that is thinner than the remainder of said side, said magnet being disposed in said portion.

19. The apparatus of claim 12, wherein said housing has an interior vertical surface against which said inertia ball is attracted by said magnet when said inertia ball is moved from said closed position to said open position by said magnet.

20. The apparatus of claim 12, wherein said recess is conical.

21. The apparatus of claim 20, wherein said conical recess has a plurality of annular ridges therein.

22. The apparatus of claim 12, wherein said housing has a magnetic force transfer member therein positioned below said valve seat adjacent to said sealing position of said magnet for attracting said inertia ball onto said valve seat.

23. A safety shut-off apparatus for shutting off the flow of a fluid upon occurrence of a vibration or seismic shock of a predetermined magnitude, comprising:
   a housing having an inlet port, an outlet port and a fluid flow passage extending between said inlet port and said outlet port;
   a valve member in said housing;
   a valve seat positioned in said fluid flow passage in said housing such that when said valve member is positioned on said valve seat in a closed position, said valve member blocks said fluid flow passage;
   a valve member recess in said housing positioned above said valve seat, said valve member being disposed in said recess in an open set position wherein said fluid flow passage is unblocked; and
   a magnet movable to and from a magnet set position for moving said valve member from said closed position to said open set position, said magnet being located in said magnet set position when said valve member is disposed in said valve member recess in said open set position so as to provide a magnetic force attracting said valve member toward said closed position on said valve seat.

24. A safety shut-off apparatus for shutting off the flow of a fluid upon occurrence of a vibration or seismic shock of a predetermined magnitude, comprising:
   a housing having an inlet port, an outlet port and a fluid flow passage extending between said inlet port and said outlet port;
   a valve member in said housing;
   a valve seat positioned in said fluid flow passage in said housing such that when said valve member is positioned on said valve seat in a closed position, said valve member blocks said fluid flow passage;
   a valve member recess in said housing positioned above said valve seat such that when said valve member is in said valve member recess in an open position, vibrations or seismic shocks of a predetermined magnitude can cause said valve member to leave said recess and fall under the force of gravity on to said valve seat to assume the closed position thereof; and
   a magnet movable on said housing, wherein said housing has a groove thereon and said magnet is disposed in said groove for movement therein.

25. The apparatus of claim 24, wherein a drive member is rotatably connected to said housing over said groove, said drive member having a drive slot therein, and said magnet being disposed in said drive slot, whereby rotation of said drive member moves said magnet in said groove.

26. The apparatus of claim 24, wherein said groove forms a closed loop on a side of said housing.

27. The apparatus of claim 24, wherein a lever is rotatably connected to said housing over said groove, said magnet being fixed to said lever, whereby rotation of said lever moves said magnet in said groove.

* * * * *